(No Model.)
A. FREY & W. KNOX.
CHECK ROW CORN PLANTER.
No. 533,452. Patented Feb. 5, 1895.
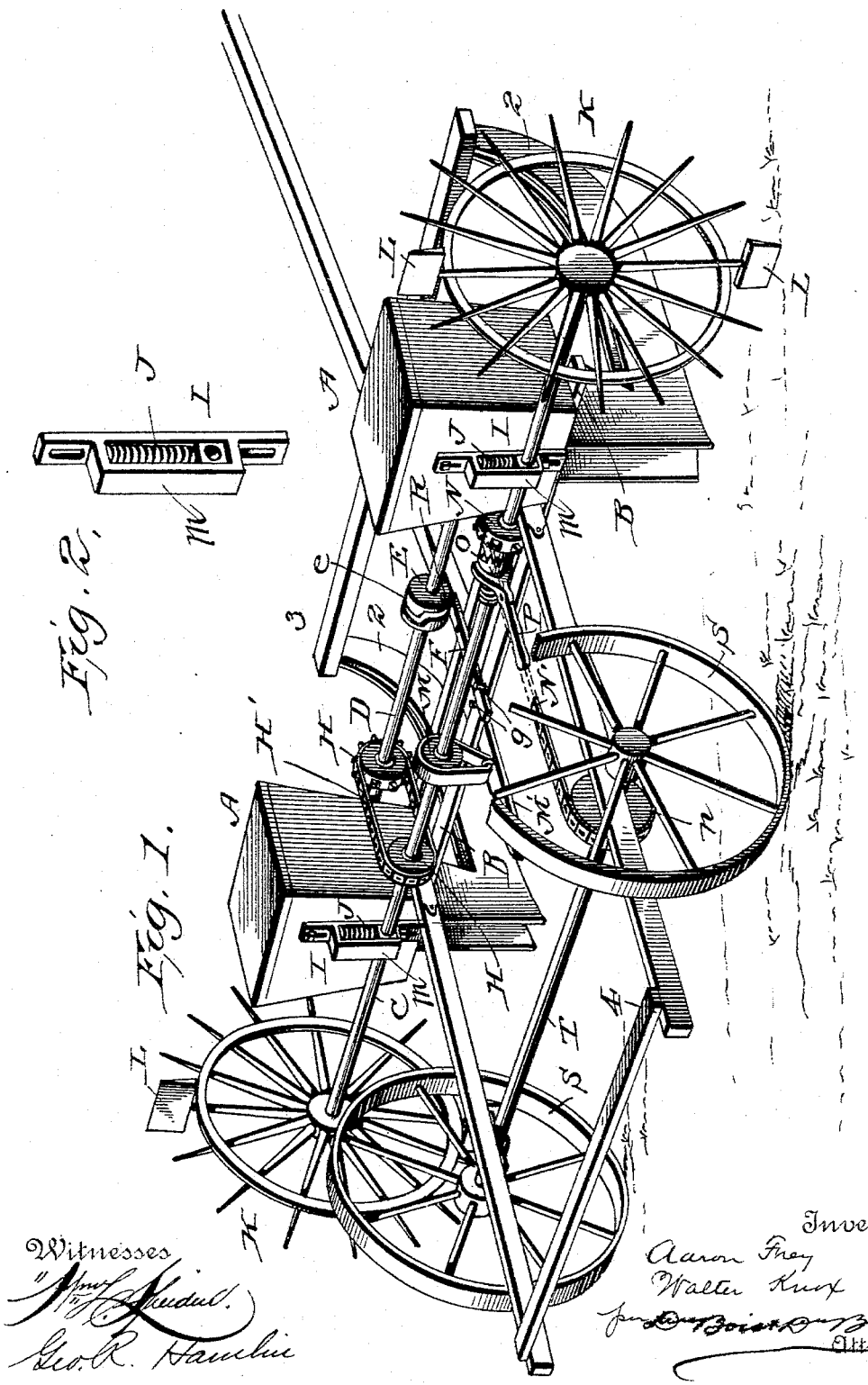

UNITED STATES PATENT OFFICE.

AARON FREY AND WALTER KNOX, OF CLARK, SOUTH DAKOTA, ASSIGNORS TO SAID FREY.

CHECK-ROW CORN-PLANTER.

SPECIFICATION forming part of Letters Patent No. 533,452, dated February 5, 1895.

Application filed March 1, 1894. Serial No. 501,974. (No model.)

*To all whom it may concern:*

Be it known that we, AARON FREY and WALTER KNOX, citizens of the United States, residing at Clark, in the county of Clark and State of South Dakota, have invented certain new and useful Improvements in Check-Row Corn-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to planters designed to sow grain in check rows; and aims to improve that class having a mechanism under the control of the driver for aligning the machine, that is, cause the planting of the seed in straight lines, without the necessity of stopping the machine or the dismounting of the driver and in which the marking and planting devices are retarded when necessary by the application of a brake mechanism, and are accelerated to allow for lost motion by a speed contrivance. These instrumentalities, the brake mechanism and the speed contrivance, are normally inactive and are brought into service only at such times when it is necessary to align the machine.

The improvement consists essentially of the novel features and the peculiar combination of the parts which hereinafter will be more fully described and claimed and which are shown in the annexed drawings, in which—

Figure 1, is a perspective view of a planter embodying the invention. Fig. 2, is a detail view of the box in which the marker shaft is journaled.

The frame 3 to which the draft is applied is supported on runners 2 of ordinary construction which also serve to open the ground in which the grain is dropped. The hoppers A are of ordinary construction and the seeds are dropped therefrom by the seed slide B in the usual manner. A shaft D suitably journaled on the frame 3 carries a cam E and a sprocket wheel H. The cam may be of desired construction which will oscillate lever F and reciprocate the seed slide B. As shown, the cam is a disk having a peripheral cam groove $e$. One end of the lever F has a pin R on which is mounted a sleeve or roller which extends into the groove $e$. The other end of the lever F works between pins $g$ on the seed slide whereby a movement of the latter is effected to drop the seed.

The marker shaft C is about twice the width of the machine, more or less, and projects at its ends beyond the sides of the machine and receives the marker wheels K, the ends of the spokes of which are sharpened and project beyond the rim of the wheels so as to enter the soil and rotate the shaft C. Marking blocks L are provided at suitable distances around the wheels. As shown two blocks L are provided and located at diametrically opposite points. These blocks indent the soil and indicate the hill or place at which the grain is planted. It must be understood that the planting mechanism and the marking devices are so disposed and timed that the seed is dropped at the same time and at or near the place where the indentation is made. This shaft C is mounted in boxes I movably attached to the hoppers so as to rise and fall to adapt the marking wheels to the nature of the land. Coil springs J hold the boxes at the lowest limit of their movement. A sprocket wheel $H^2$ on the shaft C is connected by sprocket chain H' with the sprocket wheel H to operate the shaft D.

A brake wheel M on the shaft C and a brake lever M' adapted to be pressed upon by the foot of the driver, constitute the mechanism for retarding the motion of the shaft C and the marking and planting mechanism operated thereby. Should the marker L at any time indicate that the hills of the rows are planting behind the hills of the previously planted rows the brake mechanism is applied and the motion of the shaft C checked until the hills planting are abreast or in line with the others.

The riding or wheel frame 4 is pivotally connected with the draft or runner frame 3 and is supported on wheels S mounted on the axle T. One of the wheels has a sprocket wheel $n$ attached or revolving therewith around which passes a sprocket chain N' for transmitting motion to the sprocket wheel N loose on the shaft C. The sprocket wheel N is smaller than the sprocket wheel n and has a half clutch on one side which is engaged by a corresponding half clutch O held on the shaft C by a feather and spline connection. A shipper lever P is provided to move the half clutch O in and out of engagement with the half clutch on the sprocket wheel N. When the marker shows the planting ahead, i. e., the hills planting ahead of those planted, the clutch mechanism is thrown in gear and the motion of the shaft C accelerated to cause the planting to catch up, i. e., plant the hill sooner.

On level ground it will seldom be necessary to use either the retarding or accelerating mechanism, but on hilly or uneven ground both will constantly be brought into service.

It will be observed that the boxes I in which the shaft C is mounted, are adjustably connected to the hoppers by means of the frame M so as to enable the shaft C and the markers to be moved vertically to adapt the position of the marking blocks L to the nature of the ground.

Having thus described the invention, what we claim as new, and desire to secure by Letters Patent, is—

1. In a planter, the combination of a shaft having markers at its ends, and boxes constituting bearings for the shaft having both a vertical yielding and a vertical adjustment to regulate the relative height of the markers to the nature of the soil and enable them to ride over hard and foreign substances, substantially as described.

2. In a check row planter, the combination of the wheel and runner frames, a marker shaft mounted in bearings which have a bodily vertical and yielding adjustment, a retarding and an accelerating mechanism mounted on the said marker shaft, gearing connecting the marker shaft with the axle, and a shaft for actuating the seed dropping mechanism receiving its motion from the marker shaft, substantially as described.

In testimony whereof we affix our signatures in presence of two witnesses.

AARON FREY.
WALTER KNOX.

Witnesses:
C. M. BOUCHER,
A. C. BUTTERY.